United States Patent Office 2,894,968
Patented July 14, 1959

2,894,968

PREPARATION OF ORGANOSILICON COMPOUNDS

James A. Webster, Pittsburgh, Pa., assignor to Dow Corning Corporation, Midland, Mich., a corporation of Michigan No Drawing. Application March 26, 1956
Serial No. 573,644

6 Claims. (Cl. 260—448.2)

The present invention relates to an improvement in a process for the preparation of organosilicon compounds, and is particularly adapted to the preparation of organohalosilanes.

It is well known in the art that a silicon compound containing at least one silicon-linked hydrogen atom per molecule can be reacted with an organic compound containing at least one pair of aliphatic carbon atoms linked by multiple bonds (i.e., C=C or C≡C), in the presence of a vinyl polymerization peroxy catalyst for the reaction, to produce a new carbon to silicon bond by causing the hydrogen atom to add across the double or triple bonds in the organic compound. The catalyst can be described generally as one which is ordinarily or suitably employed as a polymerization catalyst for vinyl compounds and which is preferably capable of supplying free radicals.

The prior art shows the suitability of a host of such peroxy compounds as catalysts for the reaction in question. U.S. Patents Nos. 2,510,642 and 2,524,529, for example, suggest the use of aliphatic acyl peroxides, e.g. diacetyl-, stearyl-, and di(methyl maleoyl)peroxides; aromatic peroxides, e.g. dibenzoyl- and dichlorobenzoyl peroxides; mixed peroxides such as acetyl benzoyl peroxide; organic hydroperoxides, e.g. sec- and t-butyl hydroperoxides and 1-hydroxycyclohexyl hydroperoxide-1; various organic per-compounds such as di-t-butyl perphthalate or peradipate and t-butyl perbenzoate; dihydrocarbon peroxides such as diethyl-, ethylbutyl-, and di-t-butyl peroxides; and others such as cyclohexanone-, urea hydrogen-, and diheptanol peroxides.

Although it has been intimated in the prior art that the reaction in question can take place at low temperatures in the presence of the above catalysts, in actuality it has been found that for the most part the reaction proceeds, if at all, only negligibly or immeasurably at room temperature in any practical length of time. Ordinarily the reaction requires a temperature of at least about 80° C. to produce acceptable yields of the desired products. Since this temperature is above the boiling point of the most commercially important silane reactants, e.g. HSiCl₃ and CH₃SiHCl₂, it has been necessary to conduct the reaction in a reactor capable of withstanding superatmospheric pressures.

It is an object of the present invention to provide a promoter for the above described reaction, thus providing an improved version of said reaction and obviating the above difficulties, and to provide a method whereby the reaction in question can be successfully conducted at much lower temperatures, thus effecting economies in both equipment and heat input required.

It has been found that the above described reaction, as conducted in the presence of peroxy catalysts of the above mentioned type, is unexpectedly promoted or accelerated by tin, stannous oxide, stannic oxide, stannous chloride, stannic chloride, or mixtures thereof. These promoters cause the reaction to proceed at room temperature (25° to 30° C.) or below, to produce acceptable yields of product in a reasonable length of time. This unusual effect of tin and certain tin compounds was entirely unexpected, for tin alone, without the peroxy compound, does not act as a catalyst. This effect was particularly unpredictable because it had been found that most metals had either no effect or an actual inhibitory effect upon the reaction. Even iron and various ferrous salts, which are known as promoters of peroxy catalyzed organic vinyl polymerizations, bring about an inhibition of the reaction in question here.

Accordingly the present invention relates to an improvement in the process for the production of an organosilicon compound containing at least one new carbon to silicon bond by the reaction of a silicon compound containing at least one silicon-linked hydrogen atom with an organic compound containing at least one pair of aliphatic carbon atoms linked by multiple bonds in the presence of a vinyl polymerization peroxy catalyst for the reaction, which comprises conducting the reaction in the presence of tin, stannous oxide, stannic oxide, stannous chloride, stannic chloride or mixtures thereof.

The hydrogen-containing silicon reactants referred to above are known in the art as silicon hydrides. The hydrides most applicable to the present invention are those containing a hydrogen and a halogen atom attached directly to silicon, with the remaining valences of the silicon being satisfied by a substituent selected from the group consisting of hydrogen and halogen atoms and monovalent hydrocarbon radicals. The most preferred silicon reactants are thus those having the general formula $R_xH_ySiX_{4-x-y}$ where R is a monovalent hydrocarbon radical, X is a halogen atom, x has a value of from 0 to 3 inclusive, y has a value of from 1 to 2 inclusive, and $x+y$ equals from 1 to 4 inclusive.

Silicon hydrides of the above type are well known in the art and many are commercially available materials. Examples of suitable R radicals are alkyl radicals (e.g. methy, ethyl nd octadecyl), aryl radicals such as phenyl, aralkyl radicals such as benzyl, alkaryl radicals such as tolyl, cycloaliphatic radicals such as cyclohexyl, and alkenyl radicals such as vinyl and allyl. If at least one R is an alkenyl radical, the compound can serve as a source of both the Si—H and the unsaturation necessary to the reaction, as is discussed later in greater detail. X can be any one or a mixture of any of the halogen atoms, but chlorine and bromine are preferred for their reactivity and the commercial availability of their respective compounds.

Examples of particularly preferred silicon hydrides are $HSiCl_3$, $H_2SiBr_2$, $MeHSiCl_2$, $EtH_2SiCl$, and $PhHSiCl_2$. The symbols Me, Et and Ph are used above and throughout this specification as representing methyl, ethyl and phenyl respectively. It is to be understood that a mixture of the defined silicon hydrides can be employed in this reaction if desired. Fractional average values for x and y in the above formula can of course be obtained from the use of such mixtures.

The silicon hydrides described above are reacted with any unsaturated organic compound containing at least one pair of aliphatic carbon atoms linked by multiple bonds, i.e., any compound containing ethylenic or acetylenic linkages, or with any mixtures of such compounds.

It is preferred that the unsaturated organic compound be free of any substituents capable of reacting with the silicon hydride reactant in any manner other than the desired manner. This is not absolutely essential, however, as the desired reaction can take place to some extent in spite of competing reactions. In this regard it is preferable, but not essential, that the unsaturated reactant be free of hydrogen substituted carboxyl (HC=O) groups, for such an aldehyde type group reduces the Si—H containing reactant and leads to polymeric products.

The location of the aliphatic multiple bond in the unsaturated reactant is not material, for both terminal and non-terminal unsaturation are operative. Also the reaction proceeds regardless of whether the reactant is a straight chain, branched chain, or alicyclic type of compound. The presence of aromatic unsaturation in this compound does not negative the reactivity of the required aliphatic unsaturation.

The preferred unsaturated reactants are the relatively simple unsaturated hydrocarbons and the relatively simple esters of an unsaturated carboxylic acid or of an unsaturated alcohol and a saturated carboxylic acid. The unsaturated hydrocarbons are all applicable to this invention but as a practical matter the preferred upper limit of molecular weight is in the region of 30 carbon atoms. Preferably this unsaturated hydrocarbon is an alkene, cycloalkene, or alkyne.

Examples of suitable hydrocarbon reactants are ethylene, propene, pentene, octene, octadecylene, and melene ($C_{30}$), along with mixed alkenes obtained for example by cracking a petroleum rich in alkanes. The comparable acetylene series is also suitable, e.g. acetylene, butyne-1, heptyne-1, and dodecyne-1. Examples of suitable branched chain hydrocarbons are isobutylene and 3-methylbutyne-1. As noted, the multiple bond is not necessarily a terminal one and reactants such as pentene-2, 2-methylbutene-2, and pentyne-2 are suitable. The reactants are not restricted to those containing only a single pair of carbon atoms having multiple bonds. Thus the diolefins, e.g. butadiene-1,3, pentadiene, and isoprene can be used as reactants, although they are not preferred because of their tendency to polymerize. In regard to suitable alicyclic reactants, cyclopentene, cyclohexene, 1,2,3-Me$_3$-cyclopentene, and cyclopentadiene are illustrative of suitable compounds. Suitable reactants containing an aromatic nucleus are exemplified by styrene, divinylbenzene, allylbenzene, phenylbutyldiene, and phenylacetylene.

Because of their many resin-forming possibilities, the unsaturated esters are of particular importance in forming silicon modified products according to this invention. These esters are those in which either the alcoholic or acidic radicals, or both, contain the required unsaturation. As with the hydrocarbons discussed above the esters can be straight chain, branched chain, or alicyclic in either the alcoholic or acidic radical, and the position of the multiple bond can be terminal or otherwise. The acids and alcohols from which the esters are derived are preferably of no more than 18 carbon atoms, although this is by no means a necessary limitation. The acidic radical is preferably that of a mono- or dicarboxylic hydrocarbon acid. The alcoholic radical is preferably that of a monohydric hydrocarbon alcohol. Examples of esters which can be suitably employed are as follows: allyl acetate, butenyl acetate, allyl stearate, diallyl succinate, diallyl phthalate, diallyl maleate, and such cyclic compounds as methyl bicyclo[2.2.1]-hept-5-ene-2-carboxylate, methyl 3-cyclohexenecarboxylate, and diethyl bicyclo[2.2.1]-hept-5-ene-2,3-dicarboxylate.

As has been noted above, a compound such as an alkenyl substituted silicon hydride can provide both the Si—H and the unsaturation necessary for the desired reaction. Thus it is to be understood that the term "organic" in the phrase "organic compound containing at least one pair of aliphatic carbon atoms linked by multiple bonds" is used herein as inclusive of organosilicon compounds meeting the latter requirements. Such compounds can be the single reactant in the system, for the silicon bonded hydrogen atom of one molecule will add across the multiple bond in the unsaturated radical of a fellow molecule. Of course in such a system there is also some tendency for polymerization to occur by reaction between the unsaturated radicals themselves, but it has been found that under the conditions of this invention, the addition reaction predominates. A mixture of different alkenyl substituted silicon hydrides can also be used as reactants if desired, as well as a mixture of such reactants and a purely organic unsaturated compound. In the latter case, of course, competing reactions will take place in the one system.

Examples of suitable unsaturated organosilicon hydride reactants are diphenylvinylsilane, methylvinylchlorosilane, methylphenylallylsilane, vinyldibromosilane, and bis-(methylvinylhydrogen)-disiloxane.

The reaction can be carried out using any ratio whatsoever of the silicon hydride reactant to the unsaturated reactant. As a matter of volumetric efficiency, however, it is preferred to employ a ratio ranging from 1:4 to 4:1 of these two reactants. In general, best yields have been obtained by using a ratio of about 2 to 3 moles of the silicon hydride reactant per mole of the unsaturated reactant.

In regard to the vinyl polymerization peroxy catalyst, it is preferred that at least 0.0005 mole of this catalyst be used per mole of the silicon hydride reactant, although with the more reactive compounds a smaller amount of the catalyst may be used if one is satisfied with lower yields of product. There is no particular upper limit to the amount of peroxy catalyst which can be used, as an excess ordinarily does no particular harm. In general, however, there is no advantage in employing more than about 0.1 mole of the peroxy catalyst per mole of the silicon hydride. The most preferred amounts of catalyst have been found to lie in the region of 0.005 to 0.05 mole catalyst per mole of the silicon hydride. The most preferred catalysts for the reaction of this invention are t-butyl perbenzoate, di-t-butyl perbenzoate, and t-butyl peracetate.

In regard to the amount of tin or the specified tin compounds employed herein, there seems to be no measurable minimum at which the effect of the promoter is not noticeable. For example, the reactants plus the peroxy catalyst have been contacted with elemental tin and then removed from contact, and it has been found that apparently the infinitesimal amount of tin taken into the system in this manner has been sufficient to initiate the reaction at room temperature even though the reactants and catalyst alone show no indication whatsoever of a reaction at such a temperature. Likewise there is no maximum amount which must be specified because no conceivable excess seems to have any deleterious effect upon the reaction.

From the above comments it can be seen that the tin can be present in any physical form whatsoever, e.g., as bulk tin, as a liner or other portion of the reaction vessel, as chips, granules, or powder. Naturally the larger surface area of a finely divided form of tin provides greater contact with the reactants and such forms are generally preferred. It is preferred that any elemental tin employed be at least 90 percent by weight pure tin, and purity of at least 99 percent is most preferred. As with the tin itself, the specified oxides or chlorides of tin can be in any convenient form. The best results seem to be obtained when from 0.0005 to 0.1 mole of the tin or tin compound per mole of silicon hydride is employed in the reaction. Mixtures of any of these tin compounds and the elemental tin can be employed if desired. A particularly effective catalytic effect has been obtained by employing a combination of elemental tin and $SnCl_4$ as a promoter.

As has been noted, one of the chief advantages of the invention is that the use of superatmospheric pressures can be avoided, if desired, in the use of the most commercially important reactants. This does not preclude the use of such pressures, however, and it is to be understood that any pressure, be it atmospheric, subatmospheric, or superatmospheric, can be employed. Where a gaseous reactant is involved it is obviously advantageous to conduct the reaction under some pressure.

Also, although the invention does away with the need for an elevated reaction temperature, the reaction can be carried out at any of the higher temperatures common to the art. In the latter case, the advantages of the invention lie mainly in the shortening of the time necessary to obtain a given degree of reaction or maximum yield of product. Generally the preferred reaction temperature is in the region of 20° to 180° C., and best results are obtained by maintaining at least a portion of the reactants in the liquid phase. The reaction, once initiated, is more or less exothermic. If any higher temperature thus reached is not undesirable for reasons of equipment limitations, etc., there is generally no particular need to cool the reactants to maintain a moderate temperature.

The optimum reaction time is a variable depending upon the particular reactants, reaction temperature, catalyst concentration, etc. Ordinarily there is no benefit in extending the contact time beyond about 24 hours, but there is likewise usually no harm in so doing unless an extremely elevated temperature has been employed. Often a contact time of 15 minutes, or even less, is ample to provide a suitable yield of product. Naturally a higher reaction temperature requires less time to reach a given yield.

The products of this invention are of known utility, e.g., as intermediates for the preparation of silicone resins and rubbers, and for rendering materials water repellent.

EXAMPLE 1

A mixture was prepared containing $HSiCl_3$ and pentene-1 in a molar ratio of about 2:1. The mixture was divided into two equal portions and each was placed in a glass flask. To each portion there was added t-butyl perbenzoate in an amount of about 0.02 mole per mole of the olefin. Granular tin (20 mesh) was added to one portion in an amount of 2 percent by weight of total reactants, and the flasks were sealed and allowed to stand at room temperature. After standing 1½ hours, the portion containing tin was distilled and was found to have produced 67 percent of the theoretical yield of amyltrichlorosilane, whereas after as much as 20 hours the tin-free portion showed absolutely no yield of product. When the tin containing sample was duplicated and allowed to stand at room temperature for 16 hours, a yield of about 90 percent of the theoretical amount of amyltrichlorosilane was obtained. The use of pentene-2 as the unsaturated reactant leads to the production of 2-amyl- or 3-amyl-trichlorosilane in this reaction.

EXAMPLE 2

The tin-containing sample of Example 1 was duplicated in a series of experiments, except that in place of the tin either stannous or stannic chloride, or stannous or stannic oxide were respectively employed. In each case the mixtures were allowed to stand at room temperature, and each produced amyltrichlorosilane as the product, although yields in each case were less than those obtained when elemental tin was used as the promoter. A similar series of experiments in which the t-butyl perbenzoate was not incorporated in the mixture showed that the tin or tin compounds alone would not act as catalysts for the desired reaction.

EXAMPLE 3

When hexene, $HSiCl_3$, and tin are reacted in the presence of di-t-butyl perbenzoate or t-butyl peracetate in the manner of Example 1, the product hexyltrichlorosilane is obtained. When $HSiBr_3$ is used in place of the $HSiCl_3$ in this reaction, the product is hexyltribromosilane.

EXAMPLE 4

A mixture of pentene-1, $MeHSiCl_2$, tin, and t-butyl perbenzoate in the molar proportions of Example 1 was allowed to stand at room temperature. Amylmethyldichlorosilane was obtained as the product. When the silane is $PhHSiCl_2$, the product obtained is amylphenyldichlorosilane.

EXAMPLE 5

A mixture of pentene-1, $HSiCl_3$, t-butyl perbenzoate, and tin was prepared as in Example 1. $SnCl_4$ was then added to the mixture at room temperature in an amount equal to the weight of tin present. The resulting exothermic reaction was so vigorous that the reaction mixture was blown out of the flask.

EXAMPLE 6

Employing cyclohexene as the unsaturated reactant in the reaction of Example 1 produces cyclohexyltrichlorosilane. The use of allyl acetate in the comparable reaction produces 3-trichlorosilylpropyl acetate, B.P. 143° C./70 mm. Hg, $n_D^{25}$ 1.4477, $d_4^{25}$ 1.272. When the unsaturated reactant is bicyclo[2.2.1]-hept-5-ene-2-carbonyl chloride, i.e.

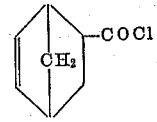

the expected adduct is obtained, B.P. 125° C./1.6 mm. Hg, $n_D^{25}$ 1.5108, $d_4^{25}$ 1.370. When diethyl bicyclo [2.2.1]-hept-5-ene-12,3-dicarboxylate,

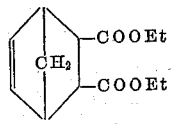

is used as the unsaturated reactant, the expected adduct is obtained having a boiling point of 164°–172°/2–3 mm. Hg, $n_D^{25}$ 1.4835, $d_4^{25}$ 1.274. This diethyl 5-trichlorosilyl-bicyclo[2.2.1]-heptane-2,3-dicarboxylate product has a neutral equivalent of 125.2 as compared to the calculated value of 124.6. The use of acetylene and high pressure equipment in the comparable reaction yields bis(trichlorosilyl)ethane.

EXAMPLE 7

This example illustrates the promotional effect of tin on the Si—H, C=C, peroxy catalyst system at elevated temperatures where the reaction will take place even in the absence of tin. A mixture of 1 mole $HSiCl_3$, 0.5 mole pentene-1, and 0.01 mole t-butyl perbenzoate was transferred in equal portions into two glass tubes having thermocouple wells. About 0.005 mole of granular tin (20 mesh, analytical reagent grade) was added to one tube. Both tubes were immediately sealed, placed in a steam bath at 85° C., and the course of the temperature rise in each was charted with the following results; as shown in Table I.

Table I

| Total Elapsed Time, Minutes | Temp., ° C., Without Tin | Temp., ° C., With Tin |
| --- | --- | --- |
| 2 | 60 | 60 |
| 7 | 78 | 93 |
| 10 | 81 | 100 |
| 14 | 83 | 135 |
| 16 | 85 | [1] 180 |
| 18 | 86 | 157 |
| 30 | 90 | 90 |
| 53 | 102 | 85 |
| 60 | [1] 143 | 85 |
| 75 | 90 | 85 |
| 90 | 86 | 85 |

[1] Maximum temperature reached.

It is to be noted that the mixture containing tin was reacting exothermically in less than 7 minutes and reached its peak temperature in 16 minutes, whereas the tin-free sample required 18 minutes to surpass the temperature of the steam bath and to begin an exothermic reaction which required 60 minutes to reach its peak. Thus the sample containing tin was essentially completely reacted before the other sample had even begun to react.

EXAMPLE 8

When diphenylvinylsilane, t-butyl perbenzoate, and tin are reacted in the manner of Example 1, a thermoplastic resin is obtained containing ethylene linked silicon atoms.

That which is claimed is:

1. In a process for the production of an organosilicon compound containing at least one carbon to silicon bond by the reaction of a silicon compound of the general formula $R_xH_ySiX_{4-x-y}$ where R is a monovalent hydrocarbon radical, X is a halogen atom, $x$ has a value of from 0 to 3 inclusive, $y$ has a value of from 1 to 2 inclusive, and $x+y$ equals from 1 to 4 inclusive, with an organic compound containing at least one pair and not more than two pairs of aliphatic carbon atoms linked by multiple bonds, selected from the group consisting of alkenes, cycloalkenes, alkynes, and unsaturated organic esters of a carboxylic acid and an alcohol, in the presence of a vinyl polymerization peroxy catalyst for the reaction, the improvement which comprises conducting the reaction in the presence of a promoter selected from the group consisting of tin, stannous oxide, stannic oxide, stannous chloride, stannic chloride, and mixtures thereof.

2. A process for the production of an organosilicon compound containing at least one carbon to silicon bond which comprises effecting reaction in the liquid phase between (1) a silicon hydride of the general formula $R_xH_ySiX_{4-x-y}$ where R is a monovalent hydrocarbon radical, X is a halogen atom, $x$ has a value of from 0 to 3 inclusive, $y$ has a value of from 1 to 2 inclusive, and $x+y$ equals from 1 to 4 inclusive, and (2) an unsaturated organic compound containing not more than two pairs of aliphatic carbon atoms linked by multiple bonds and being selected from the group consisting of alkenes, cycloalkenes, alkynes, and unsaturated organic esters of a carboxylic acid and an alcohol, in the presence of both (3) a peroxy catalyst selected from the group consisting of t-butyl perbenzoate, di-t-butyl perbenzoate, and t-butyl peracetate, and (4) a promoter selected from the group consisting of tin, stannous oxide, stannic oxide, stannous chloride, stannic chloride, and mixtures thereof.

3. A process in accordance with claim 2 wherein the silicon hydride is $HSiCl_3$.

4. A process in accordance with claim 2 wherein the silicon hydride is $CH_3SiHCl_2$.

5. A process which comprises effecting reaction in the liquid phase between $HSiCl_3$ and an alkene, in the presence of t-butyl perbenzoate as a catalyst and tin as a promoter for the reaction.

6. A process which comprises effecting reaction in the liquid phase between $HSiCl_3$ and an alkene, in the presence of t-butyl perbenzoate as a catalyst and a combination of tin and $SnCl_4$ as promoters for the reaction.

References Cited in the file of this patent

UNITED STATES PATENTS

| | | |
|---|---|---|
| 2,396,920 | Larson | Mar. 19, 1946 |
| 2,407,181 | Scott | Sept. 3, 1946 |
| 2,510,642 | Krieble | June 6, 1950 |
| 2,524,529 | Krieble | Oct. 3, 1950 |
| 2,721,873 | MacKenzie et al. | Oct. 25, 1955 |

OTHER REFERENCES

Thomas: "Anhydrous Aluminum Chloride," Reinhold Publishing Corp., New York (1941), p. 875.

UNITED STATES PATENT OFFICE
Certificate of Correction

Patent No. 2,894,968

July 14, 1959

James A. Webster

It is hereby certified that error appears in the printed specification of the above numbered patent requiring correction and that the said Letters Patent should read as corrected below.

Column 6, line 27, for "[2.2.1]-hept-5-ene-12,3-dicarboxylate" read —[2.2.1]-hept-5-ene-2,3-dicarboxylate—; line 36, for "has a" read —had a—.

Signed and sealed this 8th day of December 1959.

[SEAL]

Attest:
KARL H. AXLINE,
*Attesting Officer.*

ROBERT C. WATSON,
*Commissioner of Patents.*